(12) United States Patent
Takeuchi

(10) Patent No.: US 6,606,873 B2
(45) Date of Patent: Aug. 19, 2003

(54) EJECTOR CIRCUIT

(75) Inventor: Hirotsugu Takeuchi, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/264,636

(22) Filed: Oct. 4, 2002

(65) Prior Publication Data

US 2003/0066300 A1 Apr. 10, 2003

(30) Foreign Application Priority Data

Oct. 4, 2001 (JP) ........................... 2001-308906

(51) Int. Cl.$^7$ ................. F25B 1/06; F25B 1/00
(52) U.S. Cl. ............................... 62/191; 62/500
(58) Field of Search .................. 62/191, 500, 278, 62/511, 175, 196.4, 159

(56) References Cited

U.S. PATENT DOCUMENTS

| | | | |
|---|---|---|---|
| 3,664,150 A | | 5/1972 | Patterson |
| 3,670,519 A | | 6/1972 | Newton |
| 4,012,921 A | | 3/1977 | Willitts et al. |
| 4,187,695 A | | 2/1980 | Schmacher |
| 4,343,157 A | | 8/1982 | Hattori |
| 5,117,648 A | * | 6/1992 | Kowalski et al. ........... 62/238.6 |
| 5,239,837 A | * | 8/1993 | Kowalski et al. ........... 62/238.6 |
| 5,309,736 A | * | 5/1994 | Kowalski et al. ............. 62/500 |
| 5,315,836 A | | 5/1994 | Ressler |
| 5,343,711 A | | 9/1994 | Kornhauser et al. |
| 6,438,993 B2 | * | 8/2002 | Takeuchi et al. ............... 62/500 |
| 6,477,857 B2 | * | 11/2002 | Takeuchi et al. ............... 62/500 |
| 6,550,265 B2 | * | 4/2003 | Takeuchi et al. ........... 62/324.2 |
| 2002/0184903 A1 | * | 12/2002 | Takeuchi et al. ............... 62/175 |
| 2003/0005717 A1 | * | 1/2003 | Takeuchi et al. ............... 62/278 |
| 2003/0066301 A1 | * | 4/2003 | Takeuchi ....................... 62/191 |

FOREIGN PATENT DOCUMENTS

| | | |
|---|---|---|
| DE | 1050726 | 11/2000 |
| EP | 1134517 | 9/2001 |
| FR | 2337859 | 3/1977 |
| JP | 52156450 | 12/1977 |
| JP | 54131156 | 10/1979 |

* cited by examiner

Primary Examiner—Marc Norman
(74) Attorney, Agent, or Firm—Harness, Dickey & Pierce, PLC

(57) ABSTRACT

A first check valve 620 for allowing refrigerant to flow only from a compressor 100 to an evaporator 300 (a refrigerant passage 510) is provided in a hot-gas passage 600 that conducts refrigerant discharged from the compressor 100 into the evaporator 300 without passing through a radiator 200 and an ejector 400. Therefore, the refrigerant can be prevented from flowing into the hot-gas passage 600 during normal operation. In normal operation, the refrigerant in the hot gas passage 600 from the low pressure side (on the side of the evaporator 300) can be prevented from being retained in the hot-gas passage 600, so that the required amount of refrigerant can be reduced and the cost of producing the ejector circuit can be also reduced.

13 Claims, 7 Drawing Sheets

→ : FLOW DIRECTION DURING NORMAL OPERATION
--→ : FLOW DIRECTION DURING DEFROST OPERATION

→ : FLOW DIRECTION DURING NORMAL OPERATION
--→ : FLOW DIRECTION DURING DEFROST OPERATION

→ :FLOW DIRECTION DURING NORMAL OPERATION
--> :FLOW DIRECTION DURING DEFROST OPERATION

→ : FLOW DIRECTION DURING NORMAL OPERATION
--> : FLOW DIRECTION DURING DEFROST OPERATION

EJECTOR CIRCUIT

CROSS REFERENCES TO RELATED APPLICATIONS

This application is related to and incorporates by reference Japanese patent application number 2001-308906, which was filed on Oct. 4, 2001.

BACKGROUND OF THE INVENTION

The present invention relates to an ejector circuit having an ejector that increases the suction pressure of a compressor by converting expansion energy into pressure energy while expanding the refrigerant under a reduced pressure in a vapor compression refrigerating circuit, which transfers heat from the low-temperature side to the high-temperature side.

The term "ejector circuit" denotes a cooling circuit in which refrigerant is expanded in an ejector under a reduced pressure and a gas-phase refrigerant evaporated in an evaporator is drawn, while converting expansion energy into pressure energy to increase the suction pressure of a compressor.

In the cooling circuit, which reduces the pressure of the refrigerant by pressure reduction means in an isentropic manner (hereinafter, such a circuit is referred to as an expansion valve circuit), such as by an expansion valve, the refrigerant flowing out of the expansion valve flows into the evaporator. In the ejector circuit, on the other hand, refrigerant flowing out of the ejector flows into a gas-liquid separator, while liquid-phase refrigerant separated in the gas-liquid separator is supplied to the evaporator and gas-phase refrigerant separated in the gas-liquid separator is drawn into the compressor.

In other words, the expansion valve circuit represents a single flow of refrigerant where the refrigerant is circulated through a compressor, a radiator, an expansion valve, an evaporator, and the compressor in this order. In the ejector circuit, shown in FIG. 8, there are different flows of refrigerant. One flow allows the refrigerant to circulate through a compressor 100, a radiator 200, an ejector 400, a gas-liquid separator 500, and the compressor 100 in this order (hereinafter, such a flow is referred to as a driving flow) while the other allows the refrigerant to circulate through the gas-liquid separator 500, an evaporator 300, the ejector 400, and the gas-liquid separator 500 in this order (hereinafter, such a flow is referred to as a suction flow).

Therefore, the removal of frost that has formed on the evaporator (i.e., defrosting) can be performed by allowing a flow of a high-temperature refrigerant into the evaporator by fully opening the expansion valve. In the ejector circuit, on the other hand, the high-temperature refrigerant flowing through the radiator (the driving flow) and the suction flow through the evaporator are different. As a result the driving flow cannot be supplied to the evaporator, and defrosting cannot be performed.

Thus, as shown in FIG. 9, the present inventors investigated an ejector circuit by providing: a hot-gas passage (a bypass pipe arrangement) 600 provided for transferring a high-temperature refrigerant (hot gas), discharged from a compressor 100, to the inlet side of the evaporator 300 for the refrigerant while bypassing a radiator 200 and an ejector 400. A defrost control valve 610 is provided for opening and closing the hot-gas passage 600, so that a defrosting operation is performed by opening the defrost control valve 610. However, this can result in the problems described below.

In the trial apparatus of FIG. 9, during normal operation, in which the refrigerant is evaporated in the evaporator 300, the defrost control valve 610 is closed to prevent refrigerant discharged from the compressor 100 from passing through the hot-gas passage 600. However, the refrigerant flowing from the lower pressure side (on the side of the evaporator 300) into the hot-gas passage 600 is retained in the hot-gas passage 600. Therefore, there is the possibility that the amount of refrigerant available for normal operation will be reduced.

Thus, there is a need to use a larger amount of refrigerant in the circuit to compensate for the amount of refrigerant retained in the hot-gas passage 600. This results in an increase in the production cost of the ejector circuit. This also results in an unusual increase in the pressure at the high-pressure side if there is an overload condition.

In the expansion valve circuit, there is one variation that performs a defrosting operation by providing a hot gas passage to introduce hot gas to the evaporator without passing through the radiator and the expansion valve. In the expansion valve circuit, the hot-gas passage is connected in series with a compressor, so that refrigerant retained in the hot-gas passage can be drawn out by the compressor during normal operation.

On the other hand, in the ejector circuit, the pressure difference generated in the ejector circulates the refrigerant under a low pressure. Therefore, it is difficult to generate a sufficient drawing force to draw the refrigerant retained in the hot-gas passage. As a result, there is a high possibility that refrigerant flowing into the hot-gas passage will be retained in the hot-gas passage.

SUMMARY OF THE INVENTION

In view of the above problems, an object of the present invention is to decrease the amount of refrigerant required by the refrigeration circuit.

To attain this object, the invention includes a compressor for drawing and compressing refrigerant; a radiator for cooling the refrigerant discharged from the compressor; an evaporator for evaporating the refrigerant; an ejector having a nozzle for expanding the refrigerant under reduced pressure by converting a pressure energy of the high-pressurized refrigerant flowing out of the radiator into velocity energy, and a suction device for drawing a gas-phase refrigerant evaporated in the evaporator by a flow of refrigerant at a high speed being ejected from the nozzle and for increasing the pressure of the refrigerant by converting velocity energy into pressure energy by mixing the refrigerant ejected from the nozzle with the refrigerant drawn from the evaporator; a gas-liquid separator for storing refrigerant after separating the refrigerant into a gas-phase state and a liquid-phase state, for supplying gas-phase refrigerant to the compressor, and for supplying liquid-phase refrigerant to the evaporator; and a hot-gas passage for guiding the refrigerant discharged from the compressor to the evaporator while bypassing at least the ejector, wherein inflow-preventing means is provided for preventing the refrigerant from flowing into the hot-gas passage during a normal operation, in which the refrigerant is evaporated in the evaporator.

Therefore, the refrigerant transferred from the low pressure part (near the evaporator) into the hot-gas passage 600 is prevented from being retained in the hot-gas passage; thus the required amount of refrigerant is reduced, and the cost of manufacturing the ejector circuit is reduced.

In another aspect, the invention includes a compressor for drawing and compressing refrigerant; a radiator for cooling the refrigerant discharged from the compressor; an evaporator for evaporating the refrigerant; an ejector having a nozzle for expanding refrigerant under a reduced pressure by converting pressure energy of the high-pressurized refrigerant flowing out of the radiator into velocity energy, and a suction device for drawing gas-phase refrigerant evaporated in the evaporator by a flow of refrigerant at a high speed being ejected from the nozzle and for increasing the pressure of the refrigerant by converting velocity energy into pressure energy by mixing the refrigerant ejected from the nozzle with the refrigerant drawn from the evaporator; a gas-liquid separator for storing the refrigerant after separating the refrigerant into a gas-phase state and a liquid-phase state, for supplying gas-phase refrigerant to the compressor, and for supplying liquid-phase refrigerant to the evaporator; a drain pan for storing water dropped from at least the evaporator; a hot-gas passage for guiding refrigerant discharged from the compressor to the evaporator by way of at least the drain pan while bypassing at least the ejector, wherein inflow-preventing means is provided for preventing refrigerant from flowing into the hot-gas passage during a normal operation, in which the refrigerant is evaporated in the evaporator.

Therefore, during the normal operation, the refrigerant transferred from the low pressure part (near the evaporator) into the hot-gas passage is prevented from being retained in the hot-gas passage, so that the required amount of refrigerant is reduced, and the cost of manufacturing the ejector circuit is reduced.

If the hot-gas passage is configured to pass through the drain pan, the hot-gas passage is lengthened, which increases the possibility that the amount of refrigerant retained in may increase. However, as described above, the required amount of refrigerant is decreased, so the invention is especially effective when the hot-gas passage is lengthened. Therefore, water such as melt water or condensed water that has frozen and accumulated in the drain pan can be melted by heat, in a defrosting operation, and the required amount of refrigerant can be reduced.

In another aspect, the inflow preventing means may be a check valve that allows the refrigerant to flow only in one direction.

In another aspect, the inflow preventing means may be an electromagnetic valve that opens and closes the hot-gas passage.

Furthermore, in another aspect, the inflow preventing means may be configured such that the hot-gas passage is connected to the upper side of the refrigerant passage through which the liquid-phase refrigerant flowing out of the gas-liquid separator is passed.

Furthermore, in another aspect, the inflow preventing means may be provided in the hot-gas passage on the side of the evaporator and a defrost control valve for opening and closing the hot-gas passage is provided in the hot-gas passage on the side of the compressor.

Therefore, during a normal operation, both the inlet and outlet sides of the hot-gas passage for the refrigerant can be closed, surely preventing the refrigerant from being retained in the hot-gas passage. Therefore, it becomes possible to surely decrease the required amount of refrigerant to be enclosed.

DETAILED DESCRIPTION OF THE PREFERRED EMBODIMENTS

First Embodiment

Figure 1:
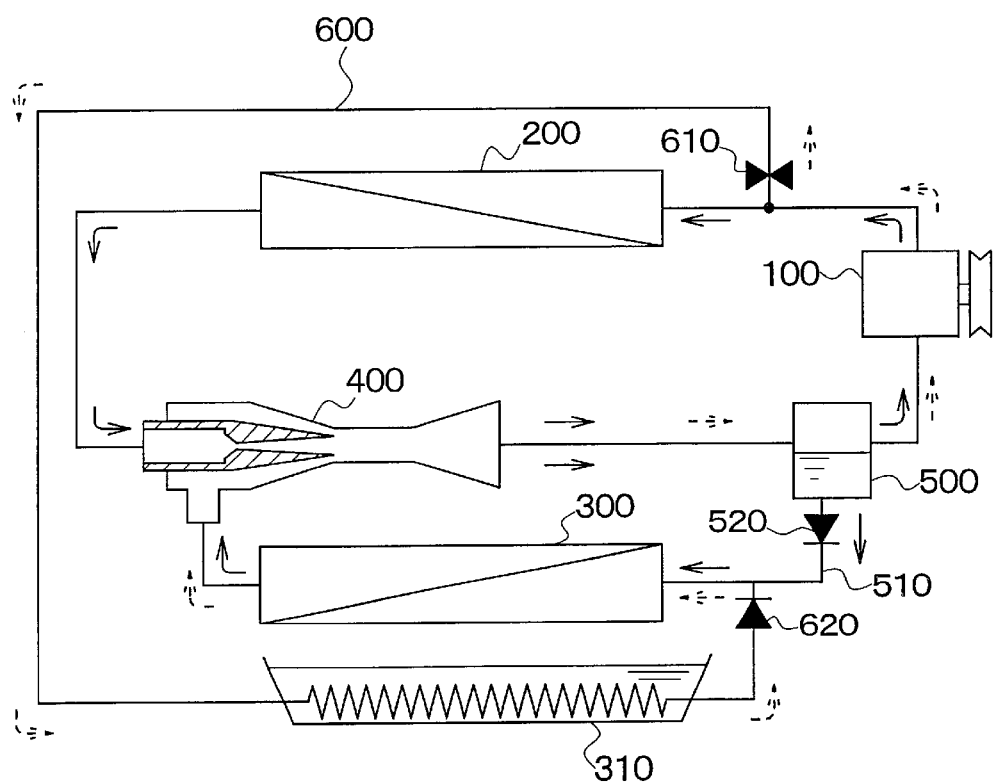
FIG. 1 is a schematic diagram of an ejector circuit in accordance with a first embodiment of the present invention.

In the present embodiment, an ejector circuit in accordance with the present invention is applied on a vehicle air-conditioning system using Freon as a refrigerant. FIG. 1 illustrates an ejector circuit in accordance with the present embodiment.

The reference numeral 100 denotes a compressor for drawing and compressing refrigerant by a driving force obtained from a driving source (not shown) such as a driving engine, and 200 denotes a radiator (a radiator) for cooling refrigerant by transferring heat from the refrigerant discharged from the compressor 100 to the outside air. Incidentally, the compressor 100 in the present embodiment is a variable capacity compressor in which the amount of discharge flow (the capacity of discharge) can be adjusted to control the temperature of the refrigerant drawn into the compressor 100 to a predetermined temperature.

An evaporator 300 vaporizes liquid-phase refrigerant when heat is transferred from the air blown out into the passenger compartment to the liquid-phase refrigerant, which cools the air. An ejector 400 expands refrigerant flowing out of the radiator 200 under reduced pressure and draws gas-phase refrigerant, vaporized in the evaporator 300, while converting expansion energy into pressure energy to increase the suction pressure of the compressor 100.

A drain pan 310 reserves condensed water generated by the evaporator 300 or melt water generated by a defrosting operation described below. In general, the drain pan 310 is located below the evaporator 300.

Figure 2:
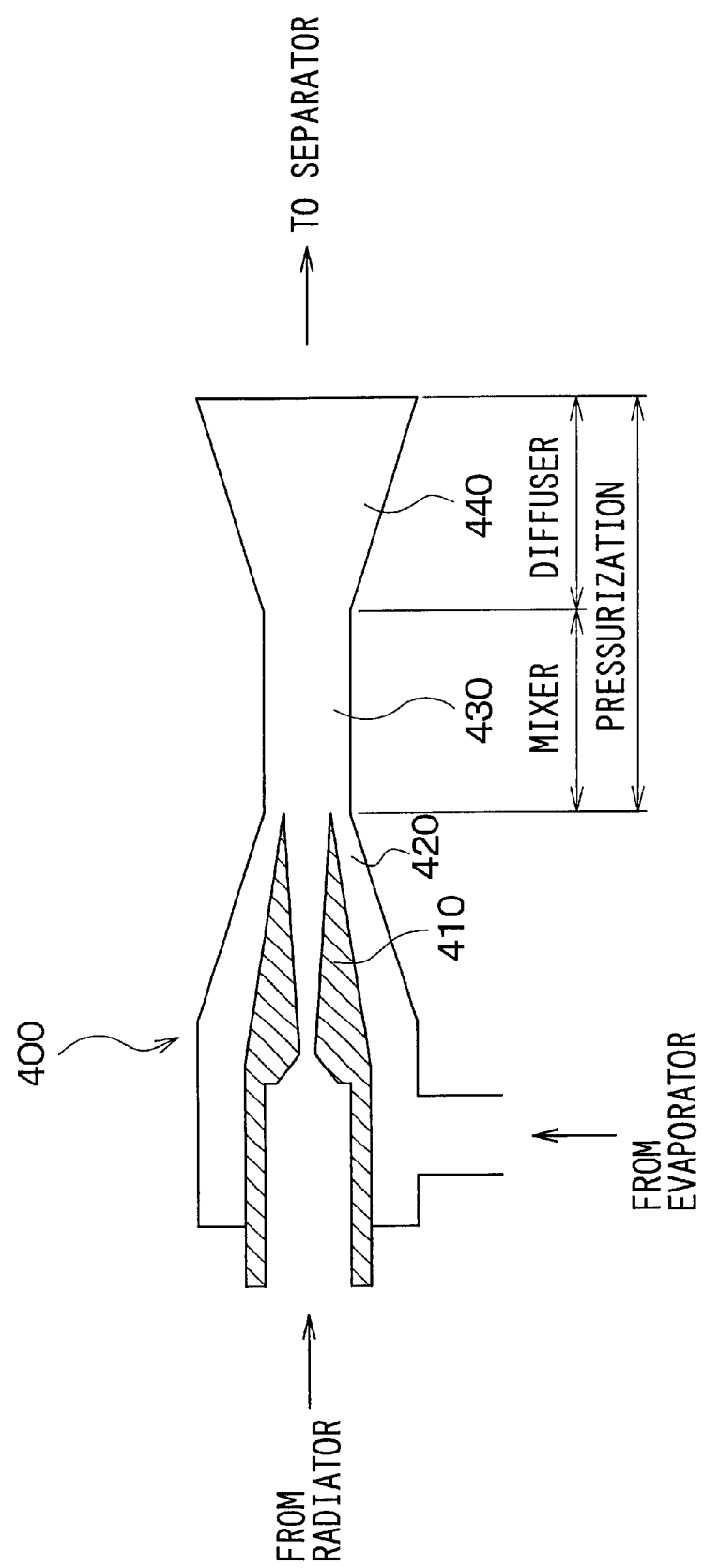
FIG. 2 is a schematic diagram of an ejector in accordance with an embodiment of the present invention.

In addition, as shown in FIG. 2, the ejector 400 includes: a nozzle 410 for converting a pressure energy (pressure head) of a high-pressure refrigerant flowing out of the radiator 200 into velocity energy (velocity head) to expand the refrigerant under reduced pressure; a refrigerant inlet port 420 into which a gas-phase refrigerant, evaporated in the evaporator 300, flows; a mixer 430 for mixing refrigerant discharged from the nozzle 410 and refrigerant drawn from the evaporator 300, while drawing refrigerant flowing into the refrigerant inlet port 420 by means of refrigerant flow (jet flow) discharged from the nozzle 410 at a high speed; a diffuser 440 for increasing the pressure of the refrigerant by converting velocity energy of the refrigerant flowing out of the mixer 430 into pressure energy; and so on.

The refrigerant inlet port 420 is formed in a tapered conical shape with a gradually decreasing cross-sectional area toward the mixer 430, and the diffuser 440 is formed in a tapered conical shape with a gradually increasing cross-sectional area toward the refrigerant outlet port.

Furthermore, in FIG. 1, a gas-liquid separator 500 receives refrigerant flowing out of the ejector 400 and separates the refrigerant into a gas-phase refrigerant and a liquid-phase refrigerant and stores the gas and the liquid. The separated gas-phase refrigerant is drawn into the compressor 100, and the separated liquid-phase refrigerant is drawn into the evaporator 300.

A hot-gas passage (a hot-gas pipe arrangement) 600 conducts refrigerant discharged from the compressor 100 to the refrigerant inlet port (to a refrigerant passage 510 between the evaporator 300 and the liquid-gas separator 500) without passing through the radiator 200 and the ejector 400. The hot-gas passage 600 is configured to pass through the drain pan 310.

Subsequently, a defrost control valve (an electromagnetic valve) 610 for opening and closing the hot-gas passage 600 is arranged in the hot-gas passage 600 closer to the compressor 100 than the drain pan 310. Also, a first check valve (inflow preventing means) 620 for allowing the refrigerant to be transferred only from the compressor 100 to the evaporator 300 (to the refrigerant passage 510) is arranged in the hot-gas passage 600 closer to the evaporator 300 than the drain pan 310. Furthermore, a second check valve 520 for allowing the refrigerant to be transferred only from the gas-liquid separator 500 to the evaporator 300 is arranged in the refrigerant passage 510 closer to the gas-liquid separator 500 than the joint where the hot-gas passage 600 joins the refrigerant passage 510.

Next, the operation of the ejector circuit (in a vehicle air-conditioning system) will be described.

1. Normal Operation (When evaporating Refrigerant in the Evaporator 300)

The compressor 100 is actuated to circulate the refrigerant discharged from the compressor 100 toward the radiator 200. As a result, the refrigerant cooled in the radiator 200 is expanded in the nozzle 410 of the ejector 400 under reduced pressure, which draws refrigerant from the evaporator 300, while the compressor 100 draws gas-phase refrigerant from the gas-liquid separator 500.

The refrigerant in the evaporator 300 is drawn by the ejector 400, so that liquid-phase refrigerant is conducted from the gas-liquid separator 500 into the evaporator 300. The refrigerant being conducted is evaporated by heat from air that is blown into the passenger compartment.

Then, the refrigerant drawn from the evaporator 300 (suction flow gas) and the refrigerant discharged from the nozzle 410 (driving flow gas) are mixed together in the mixer 430, while returning to the gas-liquid separator 500, by converting dynamic pressure into static pressure in the diffuser 440.

Figure 3:
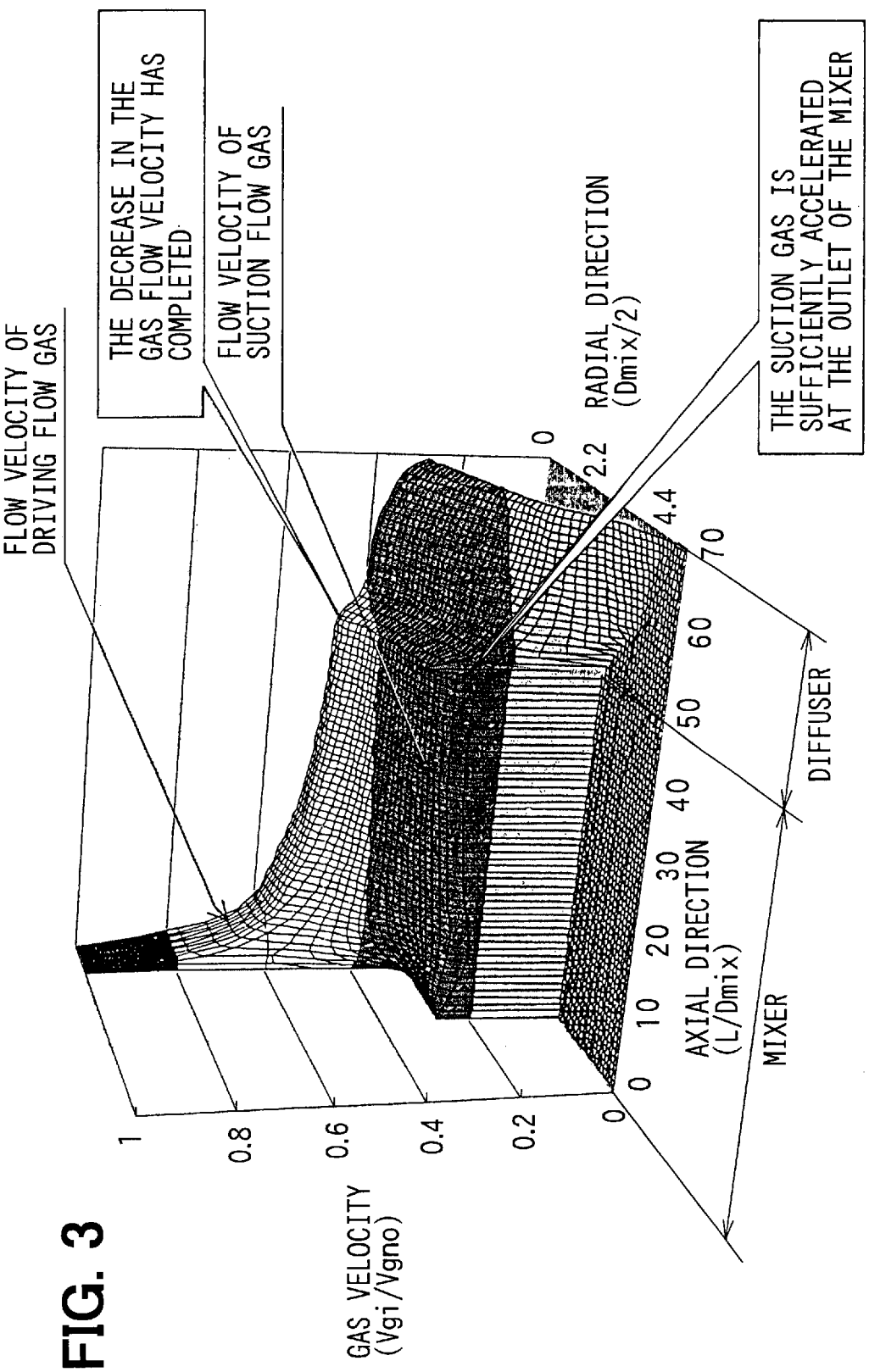
FIG. 3 is a three-dimensional characteristic diagram that represents the relationship between a position in a radial direction with reference to a central portion of a cross section of a refrigerant passage in the ejector and the flow velocity of refrigerant, from the outlet of the nozzle for the refrigerant to the outlet of the diffuser for the refrigerant.
Figure 4:
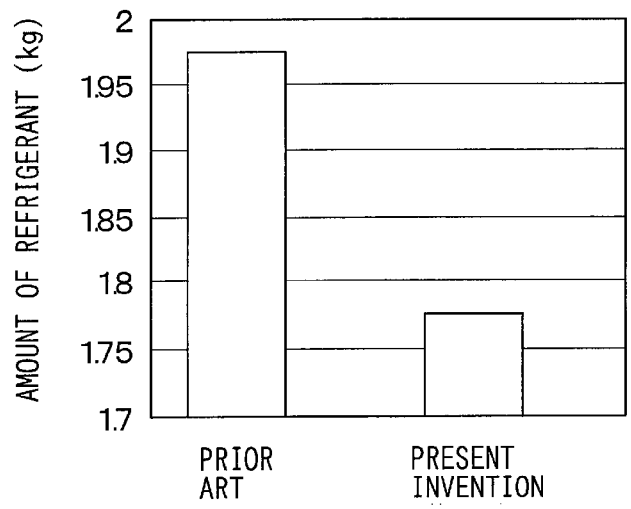
FIG. 4 is a bar graph for representing the effects of the ejector circuit in accordance with the first embodiment of the present invention.

At this time, in the mixer 430, as shown in FIG. 3, the driving flow gas and the suction flow gas are mixed together to store the sum of the momentum of the driving flow gas and the momentum of the suction flow gas. This increases the refrigerant pressure (the static pressure) in the mixer 430.

On the other hand, in the diffuser 440, the velocity energy (dynamic pressure) of the refrigerant is changed into pressure energy (static pressure) by gradually increasing the passage cross-sectional area as described above. Therefore, in the ejector 400, the refrigerant pressure is increased in each of the mixer 430 and the diffuser 440. Hereinafter, therefore, the mixer 430 and the diffuser 440 can be collectively referred to as a pressurizer. That is, in the ideal ejector 400, the pressure of the refrigerant increases to keep the sum of the momentum of the driving flow and the momentum of the suction flow in the mixer 430, while the pressure of the refrigerant increases such that the energy can be retained by the diffuser 440.

As shown in FIG. 3, the gas velocity is illustrated with respect to the velocity of the refrigerant discharged from the nozzle 410, which is defined as the integer one. The axial dimension is measured from outlet port of the nozzle 410; that is, the location of the outlet of the nozzle 410 corresponds to zero on the lower axis of the graph of FIG. 3. The radial parameter (the lower right axis of FIG. 3) is measured from the center line of the ejector 400.

2. The Defrost Operation

When the defrost control valve 610 is opened, high-temperature refrigerant (hot gas) discharged from the compressor 100 is conducted to the evaporator 300 through the hot-gas passage 600. Therefore, refrigerant is allowed to circulate through the compressor 100, the hot-gas passage 600 (drain pan 310), the first check valve 620, the evaporator 300, the ejector 400 (the refrigerant inlet part 420, the mixer 430, and the diffuser 440), the gas-liquid separator 500, and the compressor 100 in this order to heat the evaporator 300 and to melt (defrost) frost on the surface of the evaporator 300, and water, such as melt water or condensed water, that may have frozen in the drain pan 310 is thawed.

According to the present invention, the first check valve 620 is arranged on the hot-gas passage 600 and only allows refrigerant to flow from the compressor 100 to the evaporator 300 (to the refrigerant passage 510). Therefore, the first check valve 620 serves as means for preventing refrigerant from being transferred into the hot gas passage 600 during normal operation.

Therefore, during normal operation, refrigerant cannot flow from the low pressure side (the side of the evaporator 300) into the hot-gas passage 600. Thus, quantity of refrigerant required is reduced and the cost of manufacturing the ejector circuit is limited.

As described, if the hot-gas passage 600 is configured to pass through the drain pan 310, the hot-gas passage 600 is lengthened and the quantity of refrigerant retained in the hot-gas passage 600 is increased. However, since the present invention reduces the minimum quantity of refrigerant needed in the circuit, this invention is especially effective in the embodiment of FIG. 1, in which the hot-gas passage is lengthened. Therefore, water that may be frozen and retained in the drain pan 310 is thawed during the defrosting operation, while the required amount of refrigerant is limited.

Furthermore, since the defrost control valve (electromagnetic valve) 610, for opening and closing the hot-gas passage 600, is provided in the hot-gas passage 600, near the compressor 100, both inlet and outlet ports of the hot-gas passage 600 are closed during normal operation, which prevents refrigerant from being retained in the hot-gas passage 600. Therefore, the required quantity of refrigerant in the circuit is reduced.

In comparison to the prior art, the ejector circuit of the present invention requires about 10% less refrigerant.

Second Embodiment

Figure 5:
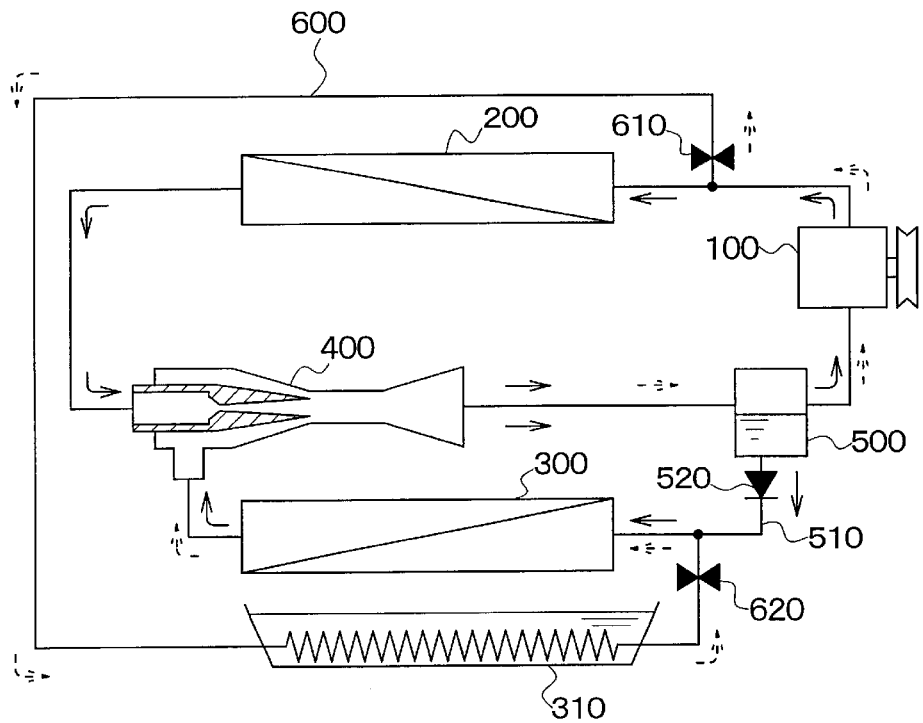
FIG. 5 is a schematic diagram of an ejector circuit in accordance with a second embodiment of the present invention.

In the first embodiment, the first check valve 620 serves as inflow preventing means. According to the second embodiment, as shown in FIG. 5, an electromagnetic valve for closing and opening the hot-gas passage 600 serves as the inflow preventing means 620. The electromagnetic valve 600 works with the defrost control valve 610.

Third Embodiment

Figure 6A:
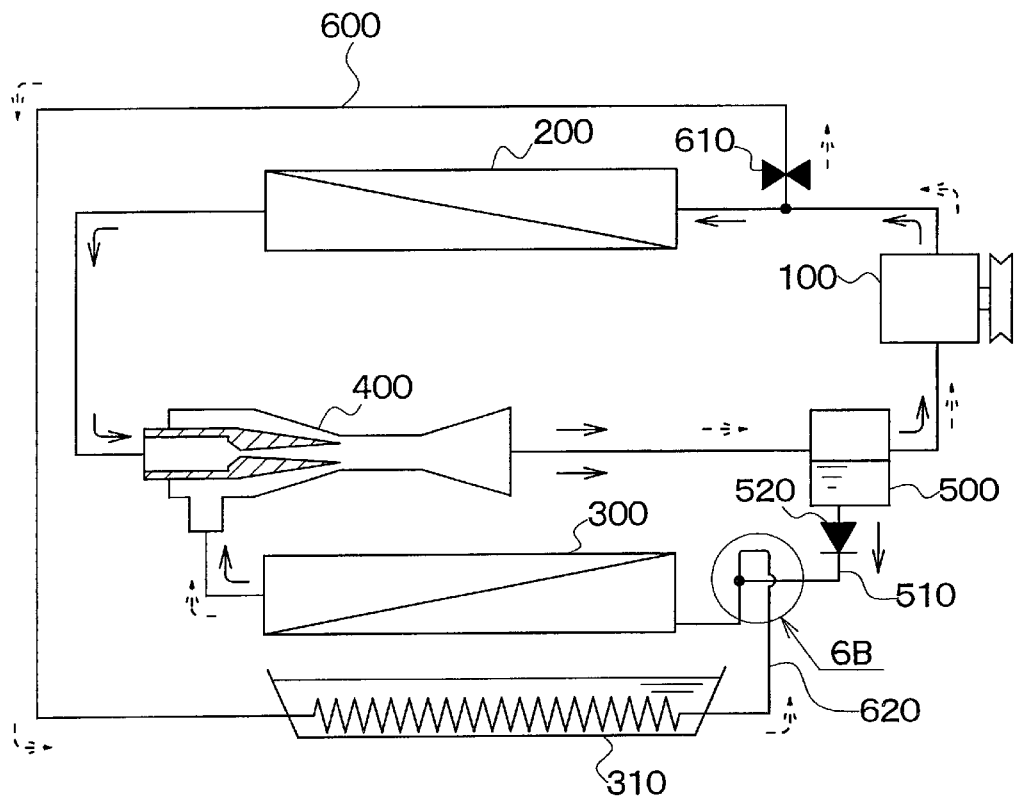
FIG. 6A is a schematic diagram of an ejector circuit in accordance with a third embodiment of the present invention.

In the first and second embodiments, the inflow preventing means 620 is constructed with the check valve, the electromagnetic valve, or the like. In the third embodiment, as shown in FIG. 6A, the hot-gas passage 600 is connected to the upper side of the refrigerant passage 5, so that the refrigerant (liquid-phase) flowing under the refrigerant passage 510 is prevented from flowing into the hot-gas passage 600 connected to the upper side of the refrigerant passage 510.

Therefore, the amount of refrigerant needed is reduced, and the total number of components of the ejector circuit is reduced.

Figure 6B:
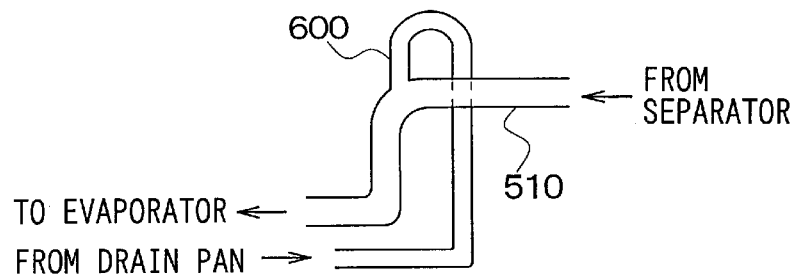
FIG. 6B is a magnified diagram of the part of FIG. 6A that is within a circle 6B.

As shown in FIG. 6B, the hot-gas passage 600 is connected at a bent portion of the refrigerant passage 510. However, the present embodiment is not so limited. The hot-gas passage 600 may be connected to a straight portion of the refrigerant passage 510.

Fourth Embodiment

Figure 7:
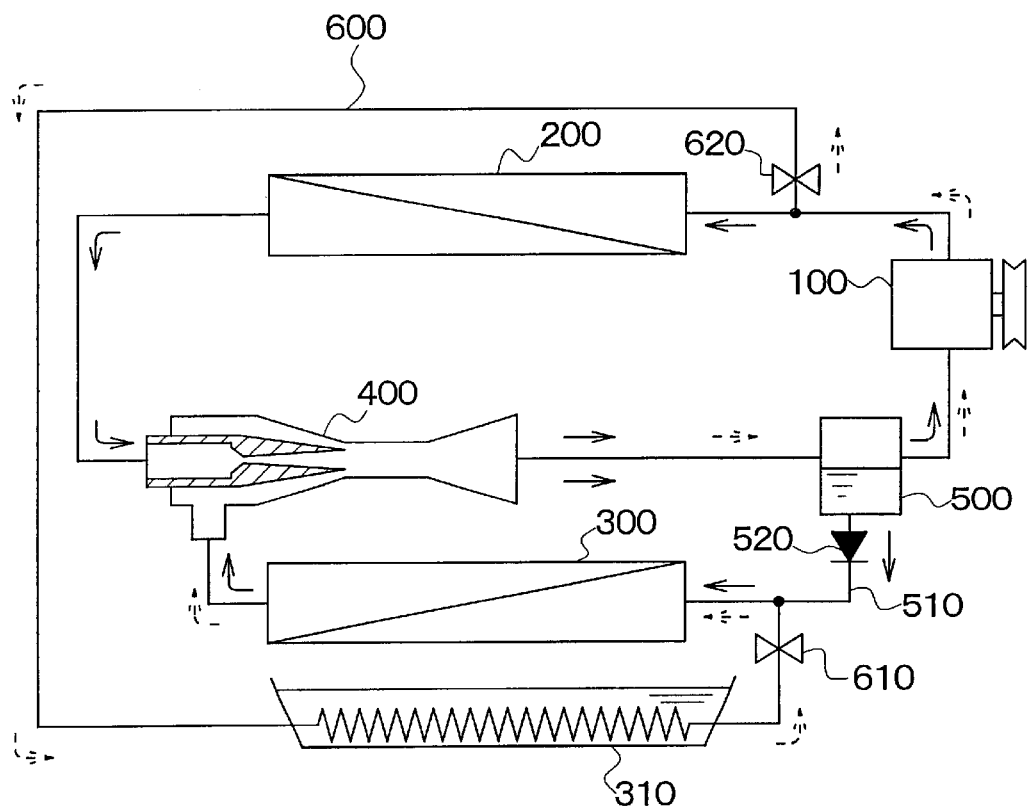
FIG. 7 is a schematic diagram of an ejector circuit in accordance with a fourth embodiment of the present invention.
Figure 8:
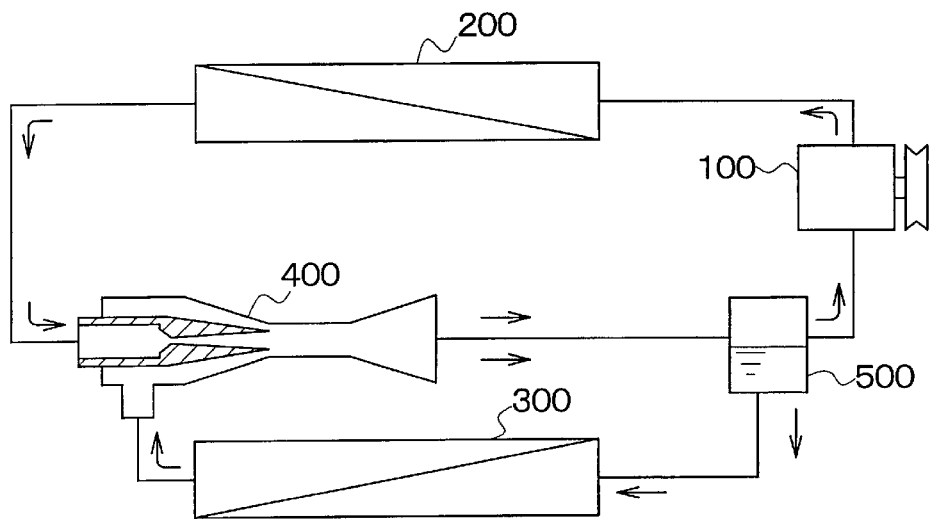
FIG. 8 is a schematic diagram of an ejector circuit in accordance with the prior art.
Figure 9:
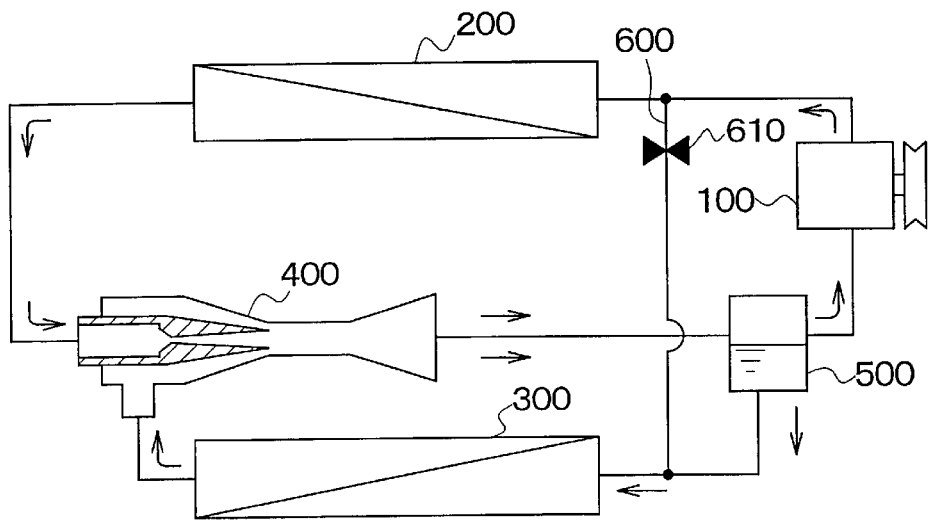
FIG. 9 is a schematic diagram of an ejector circuit in accordance with a trial investigation.

As shown in FIG. 7, the fourth embodiment is one in which the inflow preventing means 620 is arranged in the hot-gas passage near the compressor 100, and a defrost control valve 610 is arranged at the opposite end of the hot-gas passage 600, near the evaporator 300.

Further Embodiments

In the above embodiments, the invention is intended to be used with a vehicle air-conditioning system. However, the invention is not so limited and can be applied to a hot-water supply, a refrigerator, or the like.

In the above embodiments, the hot-gas passage 600 is connected to the refrigerant passage 510 downstream of the gas-liquid separator 500. However, the invention is not so limited.

Furthermore, in the illustrated embodiments, the hot-gas passage 600 conducts refrigerant into the evaporator 300 and bypasses the radiator 200 and the ejector 400. However, the present invention is not so limited. The hot gas passage may bypass only the ejector 400.

Furthermore, in the invention, the refrigerant is not limited to Freon. For example, a natural refrigerant such as carbon dioxide or nitrogen may be used to operate the ejector circuit so that the pressure on the high-pressure side is a critical pressure or higher.

What is claimed is:

1. An ejector circuit comprising:
a compressor for drawing and compressing refrigerant;
a radiator for cooling refrigerant discharged from the compressor;
an evaporator for evaporating refrigerant;
an ejector, which includes a nozzle for expanding refrigerant under reduced pressure by converting pressure energy of high-pressure refrigerant flowing out of the radiator into velocity energy, and a suction device for drawing gas-phase refrigerant, which has evaporated in the evaporator, by a high speed flow of refrigerant ejected from the nozzle and for increasing the pressure of the refrigerant by converting velocity energy into pressure energy by mixing refrigerant ejected from the nozzle with refrigerant drawn from the evaporator;
a gas-liquid separator for separating refrigerant into gas-phase and liquid-phase states, storing separated refrigerant, and supplying gas-phase refrigerant to the suction side of the compressor, and supplying liquid-phase refrigerant to the evaporator; and
a hot-gas passage for guiding refrigerant discharged from the compressor to the evaporator, wherein the hot-gas passage bypasses the ejector; and
inflow-preventing means for preventing the refrigerant from flowing into the hot-gas passage during a normal operation, in which the refrigerant is evaporated in the evaporator.

2. The ejector circuit according to claim 1, wherein the inflow preventing means is a check valve that allows the refrigerant to flow only in one direction.

3. The ejector circuit according to claim 2, wherein:
the inflow preventing means is located near the evaporator in the hot-gas passage; and
a defrost control valve for opening and closing the hot-gas passage is located near the compressor in the hot-gas passage.

4. The ejector circuit according to claim 1, wherein the inflow preventing means is an electromagnetic valve that opens and closes the hot-gas passage.

5. The ejector circuit according to claim 1, wherein the inflow preventing means is configured such that the hot-gas passage is connected to the upper side of the refrigerant passage through which the liquid-phase refrigerant flowing out of the gas-liquid separator is passed.

6. The ejector circuit according to claim 1, wherein:
the inflow preventing means is located near the evaporator in the hot-gas passage; and
a defrost control valve for opening and closing the hot-gas passage is located near the compressor in the hot-gas passage.

7. An ejector circuit comprising:
a compressor for drawing and compressing refrigerant;
a radiator for cooling the refrigerant discharged from the compressor;
an evaporator for evaporating the refrigerant;
an ejector, which includes a nozzle for expanding the refrigerant under reduced pressure by converting pressure energy of high-pressure refrigerant flowing out of the radiator into velocity energy, and a suction device for drawing gas-phase refrigerant evaporated in the evaporator by a high-speed flow of refrigerant ejected from the nozzle and for increasing the pressure of the refrigerant by converting velocity energy into pressure energy by mixing refrigerant ejected from the nozzle with refrigerant drawn from the evaporator;
a gas-liquid separator for separating refrigerant into gas-phase and liquid-phase states, storing separated refrigerant, and supplying gas-phase refrigerant to the suction side of the compressor, and supplying liquid-phase refrigerant to the evaporator;
a drain pan for reserving water collected from at least the evaporator;
a hot-gas passage for guiding refrigerant discharged from the compressor to the evaporator by way of at least the drain pan, wherein the hot-gas passage bypasses the ejector; and
inflow-preventing means for preventing the refrigerant from flowing into the hot-gas passage during a normal operation, in which the refrigerant is evaporated in the evaporator.

8. The ejector circuit according to claim 7, wherein the inflow preventing means is a check valve that allows the refrigerant to flow only in one direction.

9. The ejector circuit according to claim 8, wherein:

the inflow preventing means is located near the evaporator in the hot-gas passage; and a defrost control valve for opening and closing the hot-gas passage is located near the compressor in the hot-gas passage.

10. The ejector circuit according to claim 7, wherein the inflow preventing means is an electromagnetic valve that opens and closes the hot-gas passage.

11. The ejector circuit according to claim 10, wherein:

the inflow preventing means is located near the evaporator in the hot-gas passage; and a defrost control valve for opening and closing the hot-gas passage is located near the compressor in the hot-gas passage.

12. The ejector circuit according to claim 7, wherein the inflow preventing means is configured such that the hot-gas passage is connected to the upper side of the refrigerant passage through which the liquid-phase refrigerant flowing out of the gas-liquid separator is passed.

13. The ejector circuit according to claim 12, wherein:

the inflow preventing means is located near the evaporator in the hot-gas passage; and a defrost control valve for opening and closing the hot-gas passage is located near the compressor in the hot-gas passage.

* * * * *